United States Patent [19] | [11] 4,076,145
Zygiel, deceased | [45] Feb. 28, 1978

[54] METHOD AND APPARATUS FOR DISPENSING A BEVERAGE

[75] Inventor: Alfred E. Zygiel, deceased, late of Dallas, Tex., by Mary E. Zygiel, heir

[73] Assignee: The Cornelius Company, Minneapolis, Minn.

[21] Appl. No.: 712,935

[22] Filed: Aug. 9, 1976

[51] Int. Cl.[2] ......................... B67D 5/56; G01F 11/08

[52] U.S. Cl. ..................................... 222/1; 222/129.2; 222/373

[58] Field of Search ..................... 222/129.2, 133, 334, 222/1, 373, 386.5; 137/564.5, 101.11

[56] References Cited

U.S. PATENT DOCUMENTS 2,547,423 4/1951 Wegman et al. .................. 222/129.2
2,585,172 2/1952 Reynolds ...................... 222/129.2 X
2,748,982 6/1956 Copping .......................... 222/133 X

*Primary Examiner*—Robert B. Reeves
*Assistant Examiner*—Francis J. Bartuska
*Attorney, Agent, or Firm*—Henry C. Kovar

[57] ABSTRACT

Apparatus for mixing and dispensing a beverage has a mixing head, a water line having a partially restricted outlet for backing up water pressure, a concentrate chamber having a diaphragm, a bypass line from the water line to the chamber for bypassing water from the water line against the diaphragm and forcing concentrate to the mixing head, an open drain in the bypass line for exhausting water from the concentrate chamber, and a self-actuatable valve in the drain for closing the drain during dispensing; also disclosed is a method of mixing and dispensing a beverage in which pressurized water is first used to propel concentrate and then exhausted out a drain.

12 Claims, 1 Drawing Figure

METHOD AND APPARATUS FOR DISPENSING A BEVERAGE

BACKGROUND OF THE INVENTION

1. Field of the Invention

Figure 1:
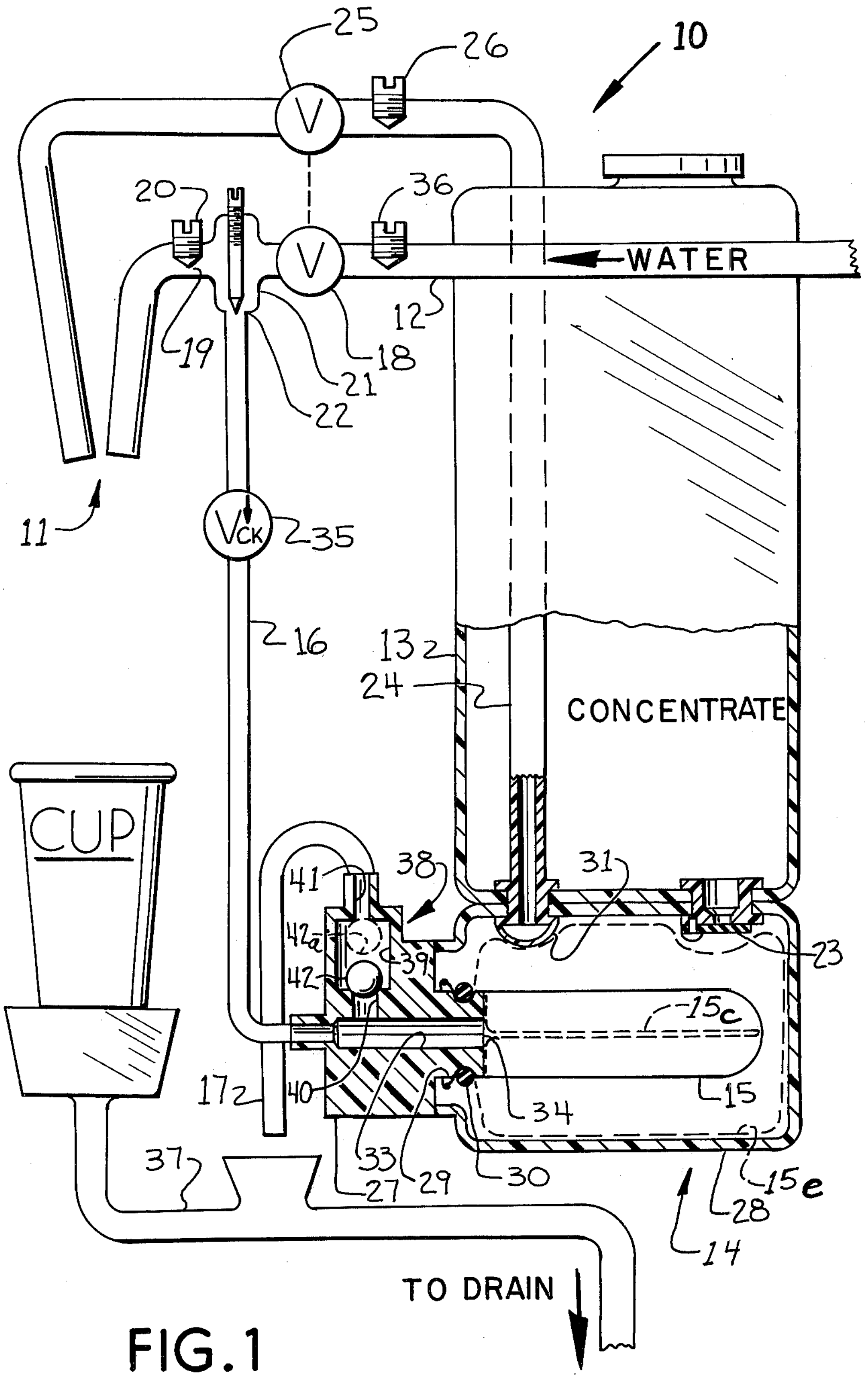

This invention pertains to apparatus and a method for dispensing a beverage in which pressurized water is used to propel beverage concentrate and is then exhausted to a drain.

2. Prior Art

The prior art devices include the apparatus and method disclosed in U.S. Pat. No. 3,779,261. Further examples of the prior art are B. G. Copping U.S. Pat. No. 2,495,210; E. S. Wegman U.S. Pat. No. 2,502,610 and N. L. Luster U.S. Pat. No. 2,538,111. All of these examples of the prior art disclose beverage dispensers which utilize the energy available in and from pressurized water to propel beverage concentrate to a mixing head.

For example, in the dispensing of carbonated beverages it is common to use and mix 5 parts of water and 1 part of syrup by volume to form a finished palatable beverage. In these prior devices, 1 part of water is bypassed or backed up to displace and propel 1 equal quantity of concentrate from a water actuated metering chamber or pump to a mixing head. As will be appreciated, when a cup is filled with beverage, the dispenser operator closes the dispensing valve or valves and terminates dispensing.

The problem then presented is what to do with or how to dispose of the 1 part of propellent water that is left in the concentrate chamber. The given examples of the prior art all dribble the water out the dispensing head or mixing head after the drink is dispensed and during this dribbling of water, the concentrate chamber is refilled with concentrate for the next dispensing cycle.

This problem was recognized by B. G. Copping and his solution is disclosed in his U.S. Pat. No. 2,748,982. Copping provides a solution for post or after-dispensing dribble of propellent water from a dispensing apparatus such as that in his U.S. Pat. No. 2,495,210.

Copping's solution is to remove the simple and single element on-off dispensing control valve in the pressurized water line and to install a triple element valve of the stacked poppet type where there is a central shaft and three poppet valves on on top of each other. Of these three poppet valves, two are normally closed and one is normally open. The pressurized water line outlet is normally closed and a water line to the mixing head is normally closed; a water drain line from a concentrate chamber to a drip tray or waste line is normally open. A separate single element normally closed valve is provided for Copping's concentrate outlet and is connected to yet another valve which opens the outlet for dispensing of mixed water and concentrate.

The gist of Copping's solution in U.S. Pat. No. 2,748,982 is that he provides a normally open outlet from a bypass line to a drain for exhausting used water from the syrup pump and he manually closes a water exhaust valve in combination with opening of water inlet and concentrate outlet valves, to pressurize a concentrate chamber and effect simultaneous dispensing of water and concentrate.

The apparatus and sequential operation of the device of U.S. Pat. No. 2,748,982 will, upon review of the patent, be realized as being costly, complicated and having many co-functional components needing to be correctly operatively synchronized together for proper operation as intended by Copping. Further, the device does not lend itself to a multiple flavor dispenser of beverages.

SUMMARY OF THE INVENTION

In accordance with this invention, an apparatus for mixing and dispensing a beverage is provided having a mixing head, a water line connected to the mixing head and having a water dispensing control valve and a partially obstructed outlet for backing up water pressure, a concentrate chamber having a diaphragm therein and an outlet to the mixing head, a bypass line from the water line to the concentrate chamber for transferring water under backed up pressure against the diaphragm for forcing concentrate to the mixing head, an open drain for exhausting bypassed water from the bypass line after dispensing and a self-actuatable valve in the drain for closing the drain during dispensing; a method is also provided in accordance with this invention in which bypassed pressurized water used for propelling and dispensing beverage concentrate is automatically exhausted to a waste drain after dispensing of beverage.

Accordingly, it is an object of the present invention to provide apparatus for mixing and dispensing a beverage, the apparatus using water for propelling concentrate and having a drain for exhausting used propellent water.

It is an object of the present invention to provide apparatus for mixing and dispensing a beverage, having a water pressure powered concentrate pump with an automatic propellent water drain of an extremely simple, reliable and low cost configuration.

It is a further object of the present invention to provide apparatus for mixing and dispensing a beverage, having a water powered concentrate pump which does not drain propellent water from a dispensing head.

It is still a further object of the present invention to provide a method of dispensing a beverage using water for pumping concentrate and draining the water used for pumping power directly to a waste line.

Many other advantages, features and additional objects of the present invention will become manifest to those versed in the art upon making reference to the detailed description and the accompanying sheet of drawing in which a preferred structural embodiment incorporating the principles of the present invention is shown by way of illustrative example.

ON THE DRAWING

FIG. 1 is a schematic drawing of apparatus for mixing and dispensing a beverage, provided in accordance with the principles of the present invention.

AS SHOWN ON THE DRAWING

The principles of the present invention are particularly useful when embodied in a beverage dispenser of the type illustrated in FIG. 1 and generally indicated by the numeral 10.

The dispenser 10 includes a dispensing or mixing head 11, a water line 12, a concentrate reservoir 13, a concentrate metering chamber 14, a diaphragm 15 in the metering chamber 14, a bypass line 16 connecting the water line 12 to the metering chamber 14 and a drain 17 in the bypass line 16.

The water line 12 is adapted to be connected at its inlet end to a source of pressurized water, such source may be either carbonated or flat water and should have a pressure of at least 7 PSIG. If the pressure of the water source is excessively high, a pressure regulator may be installed in the line which is a well known practice. There is a normally closed valve 18 in the water line 12 which is opened to allow flow of water and closed to stop flow; valve 18 thereby controls operation of the dispenser 10. The water line 12 continues past the valve 18 to the mixing head 11. There is a partially obstructed opening 19 in the water line 12 downstream of the water valve 18. In the embodiment shown, the obstructed opening 19 is formed by an adjusting screw 20 which enables adjustment of the size or cross section of the partially obstructed opening 19. Between the water valve 18 and the partially obstructed opening 19 there is a length of the water line 12 which forms a bypass chamber 21 and into which flowing water is backed up by the obstructed opening 19. There is a bypass outlet 22 from chamber 21 connected to the bypass line 16 for purposes to be later explained.

Concentrate reservoir 13 is for holding a supply of beverage concentrate. Below reservoir 13 there is a metering chamber 14 which in the beverage art is many times also referred to as a concentrate or syrup pump. Reservoir 13 is fluidly connected to metering chamber 14 through a check valve 23 which is shown as having a simple rubber flapper and the check valve 23 is arranged and is positioned to allow free flow of concentrate from reservoir 13 to metering chamber 14 and to preclude flow from metering chamber 14 to reservoir 13. Flow of concentrate through check valve 23 is by force of gravity upon the concentrate. There is a concentrate outlet line 24 from metering chamber 14 to the mixing head 11. The concentrate line 24 has a valve 25 for controlling flow of concentrate in line 24. The concentrate valve 25 must control concentrate flow so that concentrate cannot go backwards in the line 24 and fill line 24 with air. The valve 25 can be a normally closed valve which is operatively connected to work with the water valve 18 or can be a check valve which allows outwardly directed flow only. There may be an adjustable concentrate flow rate control 26 in line 24 which can be either upstream or downstream of the concentrate valve 25.

The metering chamber 14 is divided or separated into two parts by the diaphragm 15 for physically separating concentrate and bypass water as will be explained. The diaphragm 15 is mounted to and retained in place by a removable cover 27 fastened to the outer case 28 of the metering chamber 14. The cover 27 has a round tubular section 29 extending into the metering chamber 14 and upon which the diaphragm 15 is secured by a stretched O-ring 30. The diaphragm 15 is of an elastically stretchable elastomer such as latex and is formed as an elongate cylinder. As an example, an excellent diaphragm 15 is made by a cylindrical rubber balloon. This diaphragm 15 when expanded is elastically stretched and biases itself from the expanded configuration toward its normal configuration with a force or pressure of about 1.2 PSIG.

The diagragm 15 has a normal unstressed configuration which is cylindrical as is shown in solid line. Under the pressure of concentrate flowing by gravity from the reservoir 13 into the metering chamber 14, the diaphragm 15 completely collapses into the alternative configuration shown in dotted line as 15*c*. When the diaphragm 15 is blown up under pressure of bypass water for pumping concentrate as will be later explained, it will expand to a shape indicated in dotted line by 15*e* which almost completely fills the metering chamber 14. The concentrate outlet line 24 has a screen 31 which prevents the diaphragm 15 from extruding out the concentrate line 24. It has been found that the metering chamber 14 works well when sized to have a volume of approximately 200 cc; this gives a pumping capacity of about 190 cc of concentrate per cycle. It has been found that the diaphragm 15 is completely expanded by an internal pressure of 1.5 PSIG and that the entire 190 cc is pumpable by that pressure.

In order to pressurize the interior of the diaphragm 15, the bypass line 16 is connected from the water line 12 to the metering chamber 14. The bypass line 16 is fluidly connected to the water line 12 at the bypass outlet 22 of bypass chamber 21. An adjustable bypass flow control 32 is provided for enabling adjustment of the amount of water flowing into and through bypass line 16. The bypass line 16 is fluidly connected at its other end to one side of the diaphragm 15 by metering chamber cover 27 which has an internal port 33 having a diaphragm inlet 34 in fluid connection with the interior of the diaphragm 15.

There is a bypass check valve 35 fluidly mounted in the bypass line 16. The bypass check valve 35 is mounted between the water line 12 and the drain 17 and is operative to allow flow of bypass water from line 12 to the metering chamber 14 and to preclude water flow from the metering chamber 14 to water line 12. The bypass check valve 35 is an extremely economical type of valve commonly known as a "thomas" valve.

A feature of the present invention is the provision of a bypass water drain 17 in and from the bypass line 16. Although the drain 17 is shown as being in the cover 27, the entirety of the fluid passageway from the water line 12 to the diaphragm 15 is considered as the bypass line 16 and the drain 17 may be in line 16 anywhere between the check valve 35 and the diaphragm inlet 34. The metering chamber cover 27 is made of a rigid plastic and has means for holding the diaphragm 15 as previously explained, and for economy of fabrication and simplicity has both the drain 17 and the diaphragm inlet 34, which connects the bypass line 16 to the diaphragm 15, located immediately adjacent to one another as is shown. The entire bypass line 16 is relatively unrestricted to the rate of normal water flow therethrough save for the adjustable flow control 32, which is for precisely restricting and controlling flow into the bypass line 16.

A most important feature of this invention is a selfactuatable drain valve 38 in the bypass water drain 17. The drain valve 38 has an internal cage 39 which has an inlet 40 from the bypass line 16 and an outlet 41 which leads to the waste line 37. There is a ball 42 inside of the cage 39. The ball 42 has a normal position shown in solid line where it sits atop the drain inlet 40; in this position the ball 42 closes the drain inlet 40. The ball 42 is upwardly movable, as will be later described, to an alternate position, shown in dotted line as 42*a*, and when the ball 42 is in this position 42*a*, it closes the drain outlet 41. The ball 42 has a higher specific gravity than water, may be of stainless steel and is free to move up and down inside of the cage 39. The drain inlet 40 is of a larger diameter or cross section than the drain outlet 41 for purposes to be later described. When the ball 42 is sitting on the drain inlet 40 the bypass line 16 is closed so that no dust, insects or other foreign material can enter into the drain line 16, and closing of the valve inlet 40 also prevents any evaporation and loss of prime water in the bypass line 16 as will be explained. When the ball 42 is in the alternate position, 42*a*, the drain 17 is closed and no water can drain from bypass line 16 as will be explained. The ball 42 and drain outlet 41 are sized with respect to one another so that when the ball 42 is in position 42*a*, closing the drain outlet 41, the bypass pressure developed by water flowing in line 12 will hold the ball 42 in position 42*a* and keep the drain outlet 41 closed. However, when water flow in line 12 ceases, the bypass pressure drops and the ball 42 has a size and density which in combination with the area of the drain outlet 41, will cause the ball 42 to drop when the pressure in the bypass line 16 falls to a pressure in the range of $1\frac{1}{2}$ to $3\frac{1}{2}$ PSIG. This pressure range is more than the pressure exerted by concentrate in reservoir 13 and the expanded diaphragm 15*e* and therefore the drain valve 38 is self-opening against the gravitational fluid pressure of concentrate.

It will be noted that an adjustable water flow control 36 may be placed in water line 12, and that the water valve 18 and the concentrate valve 25 may be operatively connected for simultaneous or sequential operation as a particular beverage may require. It is thought to be advantageous to close the water valve 18 just slightly before closing the concentrate valve 25 so that the bypass pressure will drop before concentrate valve 25 is closed.

The dispenser 10 has a conventional waste outlet or drain 37 which gathers waste or slopped beverage from the mixing head 11 and bypass water from the drain 17 and routes it for disposal.

In operation of the dispenser 10, the water line 12 is connected to a source of pressurized water which may be regular tap water, carbonated water or any other aqueous diluent. A beverage concentrate or syrup is placed within the reservoir 13. A typical soft drink concentrate is concentrated 5 to 1 or it reguires 5 parts water to be blended to 1 part of concentrate to form a finished drink. Fruit or vegetable juice concentrates are usually less concentrated and are reconstituted at the ratio of 2.5 or 3.0 to 1. Other concentrates such as tea or coffee may require 6 or more parts of water for proper blending. It is a feature of the present dispenser 10 to be able to accommodate these many different concentrates or syrups.

As the reservoir 13 is being initially filled, concentrate flows under the force of gravity through the check valve 23 into the metering chamber 14 and collapses the diaphragm 15 to the configuration shown in dotted line 15*c* and concentrate fills the metering chamber 14.

The first or initial opening of water valve 18 primes the bypass line 16 and the concentrate outlet line 24. As the water valve 18 is opened, water flows through line 12, past flow control 36, through valve 18, into the bypass chamber 21 and then through the partially obstructed outlet 19 and then out the mixing head 11 and into either the cup or the waste outlet 37.

When the flowing water begins to flow through the partially obstructed opening 19, the pressure which the water is under from the water source is partially backed up and developed at least in part in the bypass chamber 21 as a bypass pressure. Some of the water in the bypass chamber 21 is then directed or forced by the bypass pressure through the bypass outlet 22 into bypass line 16, through the check valve 35 and against the diaphragm 15. This portion of water from line 12 which is directed through the bypass line 16 is hereinafter called the bypass water. As the bypass line 16 is primed, the ball 42 is lifted off of the drain inlet 40 and all air in the line is driven out of the drain 17. When the bypass water reaches and makes contact with the diaphragm 15, its flow is resisted by the concentrate in the metering chamber 14 and the bypass pressure begins to build up in the bypass line 16 and inside of or against one side of the diaphragm 15. As the bypass pressure builds up, bypass water begins to flow into drain inlet 40. The flow of bypass water, which is much more viscous than air, lifts the ball 42 upward and propels the ball 42 to the alternate position 42*a*. The ball 42 then covers the drain outlet 41 and the drain valve 38 is thereby closed. The ball 42 is held against the drain outlet 41 by the bypass pressure even though the ball 42 is heavier than water because the force on the ball 42 as a function of the bypass pressure and the area of the drain outlet 41 is greater than the weight of the ball 42 in the water. A typical bypass pressure will be at least 5 PSIG.

The bypass pressure continues to force bypass water into bypass line 16 and against the diaphragm 15 which initially is in the collapsed configuration of 15*c* and the diaphragm 15 begins to expand from the collapsed configuration of 15*c* to the normal configuration of 15 and then to the expanded configuration of 15*e* as will be later explained. As the diaphragm 15 is expanded by bypass water, the bypass pressure is transferred through the diaphragm 15 to the concentrate in the metering chamber 14. The check valve 23 prevents concentrate flow back into the reservoir 13 whereupon the concentrate is forced from the metering chamber 14 into the concentrate outlet line 24, past flow control 26 and valve 25 to the mixing head 11.

After the dispenser 10 is primed and both water and syrup are flowing from the mixing head 11, the ratio of water to concentrate must be adjusted to obtain the desired and proper beverage. In order to do the adjusting, the water and syrup flows are divided before mixing and the correct water flow is approximated. As an example, if the total dispensing rate is to be 60 cc per second and the ratio is to be 5 parts water to 1 part concentrate, a water flow rate of 50 cc per second is needed. Firstly, the adjustable partially obstructed opening 19 is opened to its maximum size and then the water flow control 36 or else a water pressure regulator (not shown) is adjusted to give a water flow rate coming from the mixing head in excess of the total drink rate, for example, a flow rate of 65 cc or greater. The partially obstructed opening 19 is then reduced in size to give the desired flow rate of water, i.e., 50 cc per second which restricts the flow of water and backs up at least part of the water supply pressure forming the bypass pressure in bypass chamber 21.

The concentrate flow control 26 may be set at approximately its halfway setting between minimum and maximum flow rates and the bypass flow control 32 is then adjusted to give a flow of bypass water against the diaphragm 15 which will displace concentrate and propel it out of the mixing head 11 at the approximate desired rate, i.e., 10 cc per second. The partially obstructed outlet 19 and adjusting screw 20 can then be finely reset to give the precise 50 cc per second water flow and the concentrate flow control 26 can then be set to finely control the concentrate flow rate at a precise 10 cc per second.

After the dispenser 10 is primed, a prime of bypass water is retained within the bypass line 16 by the drain valve 38 which opens for allowing the bypass water, which has previously displaced the concentrate, to drain as will be described and also seats the ball 42 against the drain inlet 40 to retain a prime of bypass water in the drain inlet 40 of the drain 17. A prime of concentrate is retained in the concentrate line 24 by the valve 25 which controls concentrate flow so that concentrate cannot flow backwards in the line 24. After priming, the metering chamber 14 is refilled with concentrate by flow under the force of gravity and the diaphragm 15 collapses to the configuration of 15*c*, and the bypass water which previously displaced and propelled the concentrate is drained out of the drain 17 simultaneously with refilling as will be later explained.

The dispenser 10 is then ready for a regular dispensing cycle during which the operation is as follows. Dispensing of a drink is started by opening the water valve 18 and concentrate valve 25 if it is cooperative with water valve 18. Water under source pressure begins to immediately flow through water line 12 and the partially obstructed outlet 19 builds up the bypass pressure in bypass chamber 21 which forces bypass water through and past bypass flow control 32 into bypass line 16 through check valve 35 and against the collapsed diaphragm 15*c*.

The bypass line 16 was previously primed so the bypass water begins to immediately flow into the drain inlet 40 and this initial flow of water immediately lifts up and forces the ball 42 against the drain outlet 42 closing the drain valve 38 and the concentrate in the metering chamber 14 is thereafter and almost immediately displaced by the incoming bypass water and forced out the concentrate outlet line 24 to the mixing head 11. As the bypass water begins flowing under bypass pressure into the diaphragm 15, the ball 42 is held closingly against the drain outlet 42 by the bypass pressure and the diaphragm 15 begins to expand from the collapsed configuration of 15*c* toward the configuration 15. During this beginning expansion, the diaphragm 15 creates absolutely no resistive pressure against the incoming bypass water but during further expansion of the diaphragm from the configuration of 15 to 15*e* a resistive pressure of about 1.2 PSI is made by the elasticity of the diaphragm 15. When the diaphragm 15 is fully expanded to the configuration of 15*e*, the screen 31 prevents the expanded diaphragm from extruding into the concentrate outlet line 24.

The normal dispensing cycle is completed before the diaphragm 15 completely expands to the configuration 15*e*. For example, a normal cup of beverage may hold approximately 300 cc which would require from 200 to 270 cc of water and from 30 to 100 cc of concentrate over a blending ratio range of from 3:1 to 9:1. The metering chamber, as previously stated, is sized at about 200 cc volume if the dispenser 10 is intended to fill one cup at a time and only part of the chamber volume is used.

When the water valve 18 is closed, flow of both water and concentrate stops immediately and concurrently because of the almost immediate dropping or loss of the bypass pressure. During the dispensing flow of bypass water and concentrate, the drain valve 38 was closed and there was no waste of bypass water. Although the ball 42 is of a higher specific gravity than water, the bypass pressure held this ball 42 against the drain outlet 42 keeping the drain valve 38 closed. The bypass water flowed into and through bypass line 16 and through check valve 35 and internal port 33 and inlet 34 to the diaphragm 15. The bypass pressure was simultaneously applied to the diaphragm 15 and the drain valve 38.

When the water valve 18 is closed and a dispensing cycle is terminated, the bypass pressure drops, flow of bypass water into line 16 ceases, the drain valve 38 opens and the bypass water runs out of the bypass drain 17. It is believed advantageous to close the water valve 18 slightly before closing the concentrate control valve 25 in order to keep the concentrate outlet line 24 open for concentrate flow to increase the rate of pressure drop in the bypass line 16 after the water valve 18 is closed. However, the concentrate valve 25 would at the most be closed just a fraction of a second after the water valve 18, and just after the hydrostatic bypass pressure is released. Immediately after the water valve 18 is closed, the pressure in the bypass chamber 21 drops, flow of bypass water into bypass line 16 ceases and the check valve 35 closes preventing backflow of bypass water up the bypass line 16 and dribbling of the bypass water from the mixing station. It is believed that it is advantageous to have the bypass check valve 35 be constructed to have a very small rearward leak, such leak being sized to be sufficient to drop the bypass pressure inside of the bypass line 16, but being so small that no appreciable amount of bypass water is discharged from the mixing head 11. With the check valve 35 having such a small rearward leak there is no possibility of a hydrostatic lock of the bypass pressure in line 16 when and if water valve 18 and concentrate valve 25 are simultaneously closed.

When the bypass pressure within the bypass line 16 drops, the drain valve 38 immediately opens. As was previously explained, the ball 42 is of a higher specific gravity than water and will sink in water. The force of the bypass pressure against the ball 42 while covering the open area of the drain outlet 41 holds the ball 42 in a position 42*a* closing the drain valve 17. When the bypass pressure drops, there is no longer a force across the open area of the drain outlet 41 and the ball 42 drops in the water within the cage 39. As soon as the ball 42 drops below the drain outlet 41, the bypass water, which was just used to propel concentrate, begins to flow out the drain 17 in a path through the drain inlet 40, through the cage 39 and around the ball 42 and out the drain outlet 41. The drain inlet 40 is as large as possible so that the drainage flow rate of bypass water is slow enough through the drain inlet 40, so that the ball 42 is not raised up against the drain outlet 41. The drain outlet 41 is much smaller than the drain inlet 40 and is the greatest restriction to drainage flow and forms the pressure drop during drainage so that there is no substantial pressure drop in the water flow through the cage and around the ball.

It was previously mentioned that the diaphragm 15 had a resistive pressure to expansion of about 1.2 PSIG. A typical reservoir 13 will be about 15 inches high and therefore when the reservoir 13 is filled, the head pressure of the concentrate is about $\frac{1}{2}$ (0.5) PSIG. The bypass pressure during dispensing should be at least 5 PSIG and peferably higher; it is a requirement that the bypass pressure be higher than the combined diaphragm 15 and concentrate head pressure. If the water supply pressure is very low, the bypass adjustment screw 32 can be backed out to completely open the bypass outlet 22 or if the supply pressure is high, the screw 32 can be turned in to partially close down the bypass chamber outlet 22 and partially restrict the flow of water into the bypass line 16 and controlling the rate of flow of bypass water. In order to maintain the bypass pressure and keep the drain valve closed, the concentrate flow control 26 is turned down to restrict the concentrate flow rate and develop a back pressure in concentrate line 24 during dispensing; this same concentrate back pressure is maintained in the metering chamber 14 and transferred through the diaphragm 15 into the bypass water in the bypass line 16. When the water valve 18 is closed, the bypass pressure drops and at a bypass pressure in the range of 1.5 to 3.5 PSIG, the pressure force on ball 42 will no longer hold the ball 42 up and it drops inside of cage 39 and the drain valve 17 opens and the remainder of the bypass pressure is released. All bypass water then in the bypass line 16 is under whatever pressure the diaphragm 15 may produce and the head pressure of the concentrate in reservoir 13. The pressure at which the drain valve 17 opens is always higher than the combined concentrate head pressure and the resistive back pressure of the diaphragm 15.

It will be apparent that the metering chamber 14 must now be recharged with concentrate. Concentrate valve 25 is closed, be it a check valve or an open-close valve co-functional with water valve 18. The concentrate in the reservoir 13, under force of gravity, opens the check valve 23 and begins to flow into and refill the metering chamber 14. During this refilling, the previously used bypass water is released through the drain 17. The rate of refill is determined by the rate of flow of water out of the drain 17. If the diaphragm 15 has been expanded past configuration 15, it will give a small pressure boost to drive waste water through the drain 17. Typically, the refilling of the metering chamber will take from 2 to 3 times as long as the dispensing time. The incoming concentrate, under the force of gravity, will completely collapse the diaphragm 15 to the configuration of 15*c*. When the metering chamber 14 is refilled, flow of previously used bypass water through the drain 17 ceases and the ball 42 closes the drain inlet 40 and retains a prime of bypass water for the next dispensing cycle.

The diaphragm 15 is easily cleaned or replaced as it may be easily removed by removal of the cover 27 from the metering chamber 14 and removal of the retaining O-ring 30.

It will be appreciated from the foregoing that this dispenser 10 is of extremely simple construction and is virtually foolproof as it does not require complicated valving and the like. It is particularly well adapted for use in a home where the water line 12 is hooked to the house water supply and does not either waste water or dribble water out of the dispensing head 11 after a drink is dispensed.

If the dispenser 10 is to be used only with a specific concentrate and predetermined water supply pressure, it can be further simplified by removal of some of the adjustable flow control elements, but for purposes of illustration an adjustable dispenser 10 capable of dispensing virtually all types of beverages is shown and described.

Although various and minor modifications may be suggested by those versed in the art, it should be understood that I wish to embody within the scope of the patent warranted hereon, all such embodiments as reasonably and properly come within the scope of my contribution to the art.

I claim as my invention:

1. Apparatus for mixing and dispensing a beverage comprising:

a. a dispensing head for mixing of water and beverage concentrate;

b. a water line having one end for being connected to a supply of pressurized water, a valve for control of flow of water through the line, and a water chamber downstream of the valve and having a partially obstructed outlet for developing pressure in the chamber during flow of water therethrough, the outlet being in fluid communication with the dispensing head;

c. a reservoir for containing a supply of beverage concentrate;

d. a concentrate metering chamber in fluid communication with the reservoir and being fillable from the reservoir;

e. a valve between the reservoir and the metering chamber for allowing concentrate flow from the reservoir to the metering chamber and for preventing concentrate flow from the metering chamber to the reservoir;

f. a concentrate line between the metering chamber and the dispensing head, there being a valve in the concentrate line for controlling flow of concentrate therethrough;

g. a bypass line fluidly connecting the water chamber to the metering chamber, for bypassing water from the water chamber to the metering chamber under the pressure formed by the flow of water through the partially obstructed outlet;

h. a diaphragm positioned in the metering chamber for physically separating concentrate and water in the metering chamber, the diaphragm being distortable upon flow of and under the pressure of bypassed water flowing into the metering chamber, for pressurizing the concentrate in the mixing chamber and forcing concentrate through the concentrate line to the dispensing head;

i. a bypass drain fluidly connected to the bypass line and having a normally open self-actuatable drain valve which is responsive to and closable upon flow of bypass water under bypass pressure into the drain, and which is self openable upon dropping of the bypass pressure for drainage of the bypass water from the bypass line to a waste outlet.

2. Apparatus according to claim 1, in which the drain valve has a ball which is movable by a flow of bypass water to a position against a seat for closing of the drain valve.

3. Apparatus according to claim 2, in which the ball is movable upwardly for closing of the drain valve.

4. Apparatus according to claim 1, in which the bypass drain has an inlet from the bypass line to the drain valve which is sized to have a lesser restriction to flow of bypass water than does an outlet from the drain valve.

5. Apparatus according to claim 1, including a bypass check valve fluidly in the bypass line between the water chamber and the drain, the bypass check valve being operative for allowing flow of bypass water only from the water chamber toward the metering chamber.

6. Apparatus according to claim 1, including means in the concentrate line for controlling the rate of flow of concentrate in the concentrate line.

7. Apparatus according to claim 1, in which the drain valve is self-opening against the pressure of concentrate in the reservoir and metering chamber and under the force of gravity.

8. A method of mixing and dispensing a beverage comprising the steps of:

a. providing a beverage concentrate in a metering chamber;

b. opening a dispensing valve and passing a flow of water through a water line from a pressurized water source to a dispensing head;

c. partially obstructing the flow of water and developing a bypass pressure downstream of the valve when the valve is opened;

d. directing a bypass flow of water under the bypass pressure through a bypass line to an open drain valve;

e. closing the drain valve with the flow of water thereinto;

f. maintaining the drain valve closed with the bypass pressure;

g. directing the bypass flow of water under the bypass pressure into the metering chamber and displacing concentrate therefrom;

h. transferring the displaced concentrate to the dispensing head and combining the concentrate with water to form a palatable beverage;

i. closing the dispensing valve, thereby terminating the flow of water and limiting the amount of beverage dispensed, and dropping the bypass pressure;

j. opening the drain valve in response to the dropping of the bypass pressure; and subsequently k. draining the bypass water from the metering chamber through the open drain valve.

9. A method according to claim 8, including the step of restricting the transferring of displaced concentrate to the dispensing head and developing a concentrate back pressure as a consequence of said restricting.

10. A method according to claim 8, including the step of checking against reverse flow of bypass water between the water line and the drain valve.

11. A method according to claim 8, including the step of opening the drain valve in response to a dropping of the bypass pressure into the range of 1.5 to 3.5 PSI.

12. A method according to claim 8, including the step of draining at least part of the bypass water under the pressure of concentrate refilling the metering chamber under the force of gravity.

* * * * *